3,332,909
POLYARYLENE POLYETHERS
Alford G. Farnham, Mendham, and Robert N. Johnson, Basking Ridge, N.J., assignors to Union Carbide Corporation, a corporation of New York
No Drawing. Filed July 15, 1965, Ser. No. 472,322
6 Claims. (Cl. 260—47)

This invention relates to a class of organic polymers having ether oxygen atoms valently connecting together aromatic nuclei or residua or aromatic compounds. In particular, this invention relates to high molecular weight polyarylene polyethers characterized by excellent physical, chemical and thermal properties.

The polyarylene polyethers of this invention are linear thermoplastic polymers composed of recurring units having the formula $$\{O\text{—}G\text{—}O\text{—}G'\}$$  I wherein G is the residuum of a dihydric phenol selected from the group consisting of

II and

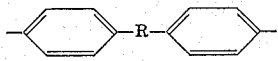

III wherein R represents a bond between aromatic carbon atoms, —O—, —S—, —S—S—, or a divalent hydrocarbon radical having from 1 to 18 carbon atoms inclusive, and G' is the residuum of a dibromo or diiodobenzenoid compound selected from the group consisting of

IV and

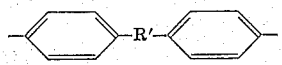

V wherein R' represents a bond between aromatic carbon atoms, —O—, —S—, —S—S—, or a divalent hydrocarbon radical having from 1 to 18 carbon atoms inclusive, with the provisos that when R is —O—, R' is other than —O—; when R' is —O—, R is other than —O—; when G is II, G' is V, and when G' is IV, G is III. Polyarylene polyethers of this type exhibit excellent physical properties as well as excellent thermal, oxidative and chemical stability. These polymers find wide utility in the production of shaped and molded articles and in the preparation of film and fiber products.

The phrase "divalent hydrocarbon radical" as used herein to partly define R and R' is intended to encompass both unsubstituted and substituted radicals. Illustrative of suitable radicals are alkylene radicals, such as ethylene, methylene, tetramethylene, pentamethylene, hexamethylene, 2-ethyl hexamethylene, octamethylene, nonamethylene, decamethylene, and the like; divalent cycloaliphatic radicals, such as 1,4-cyclohexane, 1,3-cyclohexane, 1,2-cyclohexane, and the like; alkoxy and aryloxy substituted alkylene and cycloaliphatic radicals, such as methoxymethylene, ethoxymethylene, ethoxyethylene, 2-ethoxytrimethylene, 3-ethoxypentamethylene, 1,4 - (2 - methoxy cyclohexane), phenoxyethylene, 2-phenoxytrimethylene, 1,3-(2-phenoxycyclohexane), and the like; aralkylene radicals, such as 2-phenyl decamethylene, and the like; aromatic radicals, such as phenylene, napthylene, and the like; halogenated aromatic radicals, such as 1,4-(2-chlorophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-( 2 -ethylphenylene), 1,4 - (2 - n-propylphenylene), 1,4-(2-n-butylphenylene), 1,4 - (2 - n-dodecylphenylene), and the like.

The residuum G of the dihydric phenol can be a mononuclear phenylene group as results from hydroquinone and resorcinol, or it can be a dinuclear residuum. The residuum G can also be substituted with other inert nuclear substituents such as alkyl, alkoxy and like inert substituents.

It is preferred that the dihydric phenol be a weakly acidic dinuclear phenol such as, for example, the dihydroxy diphenyl alkanes which are commonly known as "bisphenols," such as, for example, the 2,2-bis-(4-hydroxyphenyl)propane, 1,1-bis-(4-hydroxyphenyl)-2-phenylethane, bis-(4-hydroxyphenyl)methane and the like. Other suitable dinuclear dihydric phenols are the bisphenols of a symmetrical or unsymmetrical joining group as a bond between aromatic carbon atoms, —O—, —S—, —S—S—, or divalent hydrocarbon radicals as described previously.

Examples of specific dihydric dinuclear phenols include among others 4,4'-dihydroxydiphenyl,
2,2-bis(4-hydroxyphenyl)propane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenylpropane,
2,2-bis-(4-hydroxyphenyl)-1,1,1,3,3,3-hexafluoropropane,
di(hydroxyphenyl)-sulfides and disulfides such as
bis-(4-hydroxyphenyl)sufide,
5-chloro-4,4-dihydroxydiphenyl sulfide,
5-choloro-4,4'-dihydroxydiphenyl disulfide,
di(hydroxyphenyl)ethers such as
bis-(4-hydroxyphenyl)ether,
4,4'-dihydroxy-2,6-dimethyldiphenyl ether,
bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxynaphthyl)ether,
bis-(4-hydroxy-3-chloronaphthyl)ether,
4,4'-dihydroxy-3,6-dimethoxydiphenyl ether,
4,4'-dihydroxy-2,5-diethoxydiphenyl ether, and like materials.

It is also contemplated to use a mixture of two or more different dihydric phenols to accomplish the same ends as above. Thus when referred to above the G residuum in the polymer structure can actually be the same or different aromatic residua. Thus, as used herein, the G term defined as being the "residuum of a dihydric phenol" refers to the residue of the dihydric phenol after the removal of the two aromatic hydroxyl groups.

The residuum G' of the dibromo or diiodobenzenoid compound can be a mononuclear phenylene group as results from 1,4-dibromobenzene, or it can be a dinuclear residuum. The residuum G' can also be substituted with other inert nuclear substituents such as alkyl, alkoxy and like inert substituents.

Examples of specific dibromo and diodobenzenoid compounds include among others, 1,4-dibromobenzene,
4,4'-dibromodiphenyl,
bis-(4-bromophenyl)benzene,
2,2-bis-(4-bromophenyl)propane,
bis-(4-bromo-2,6-dimethyl-3-methoxyphenyl)methane,
1,1-bis-(4-bromophenyl)ethane,
1,2-bis-(4-iodophenyl)ethane,
1,1-bis-(4-bromo-2-chlorophenyl)ethane,
1,1-bis-(3-methyl-4-bromophenyl)propane,
1,3-bis-(3-methyl-4-bromophenyl)propane,
2,2-bis-(3-phenyl-4-bromophenyl)propane,
2,2-bis-(3-isopropyl-4-bromophenyl)propane,
2,2-bis-(4-bromonaphthyl)propane,
2,2-bis-(4-iodophenyl)pentane,
3,3-bis-(4-bromophenyl)pentane,
2,2-bis-(4-bromophenyl)heptane,
bis-(4-bromophenyl)phenylmethane,
2,2-bis-(4-bromophenyl)-1-phenylpropane,
2,2-bis-(4-iodophenyl)-1,1,1,3,3,3-hexafluoropropane,
di(bromophenyl)sulfides and disulfides such as
bis-(4-bromophenyl)sulfide,
bis-(4-bromophenyl)disulfide,
5-chloro-4,4'-dibromodiphenyl sulfide,
5-chloro-4,4'-dibromodiphenyl disulfide,
di(bromophenyl)ethers such as
bis-(4-bromophenyl)ether,
4,4'-dibromo-2,6-dimethyldiphenyl ether,
bis-(4-bromo-3-isobutylphenyl)ether,
bis-(4-bromonaphthyl)ether,
4,4'-dibromo-3,6-dimethoxydiphenyl ether,
4,4'-dibromo-3,5-diethoxydiphenyl ether, and the like.

It is also contemplated to use a mixture of two or more different dibromo or diodobenzenoid compounds. Thus when referred to above the G' residuum in the polymer structure can actually be the same or different aromatic residua. Thus, as used herein, the G' term defined as being the "residuum of a dibromo or diodobenzenoid compound" refers to the residue of the dibromobenzenoid compound after the removal of the two bromine atoms.

Thermoplastic polyarylene polyethers described herein can be prepared in a substantially equimolar reaction of a double alkali metal salt of the dihydric phenol with a dibromobenzenoid compound in the presence of a cuprous salt or cuprous salt complex as a catalyst. Any alkali metal salt of the dihydric phenol can be used as the one reactant. For purposes of this invention, to obtain high molecular weight polymers, it is preferred to conduct the reaction under substantially anhydrous conditions and in an oxygen free atmosphere.

Generally the reaction is carried out in an inert diluent in which the alkali metal salt of the dihydric phenol and/or the dibromo or diodobenzenoid compound is partly soluble. Suitable solvents include benzophenone, diphenyl ether, benzonitrile, dialkoxy benzenes in which each alkoxy group contains from 1 to 4 carbon atoms, trialkoxy benzenes in which each alkoxy group contains 1 to 4 carbon atoms, diphenyl sulfone, dimethylsulfoxide, dimethylsulfone, diethylsulfoxide, diethylsulfone, diisopropylsulfone, tetrahydrothiophene, 1,1-dioxide (commonly called tetramethylene sulfone or sulfolane), tetrahydrothiophene-1 monoxide, and the like.

The double alkali metal salt of the dihydric phenol generally exists in the hydrate form which should be dehydrated separately or in the reaction mass to insure anhydrous conditions. Similarly, the alkali metal salt can be prepared in situ in the inert diluent by reacting the dihydric phenol with an alkali metal, alkali metal hydroxide, alkali metal hydride, alkali metal hydroxide, alkali metal carbonate or alkali metal alkyl compound, and thereafter removing water, by distilling off a water-containing azeotrope from the reaction mass or by like techniques, to obtain anhydrous conditions. Benzene, xylene, halogenated benzenes and other inert azeotrope forming organic liquids are suitable for this purpose.

The cuprous catalyst employed in the reaction can be a cuprous salt such as a cuprous halide, for example cuprous chloride, cuprous bromide or cuprous iodide. Cuprous halides are preferred since they are highly effective but other cuprous salts can also be employed, for instance cuprous abietate (formed in situ by the reduction of cupric abietate), cuprous formate, and the like. The cuprous catalyst can also be a complex of any of the foregoing cuprous salts obtained by combining the cuprous salt with a complexing agent such as pyridine, dimethyl acetamide, quinoline, dimethylformamide, n-methylpyrrolidone, and the like. The quantity of the complexing agent can be varied widely but is usually in excess of the cuprous salt.

The reaction between the dibromobenzenoid compound and the alkali metal salt of the dihydric phenol proceeds on an equimolar basis. This can be slightly varied but as little a variation of 5 percent away from equal molar amounts seriously reduces the molecular weight of the polymers.

Reaction temperatures above room temperature and generally above 100° C. are preferred. More preferred are temperatures between about 120° C. to 260° C. Higher temperatures can of course be employed, if desired, provided that care is taken to prevent degradation or decomposition of the reactants, the polymer and the solvents employed.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal bromide on each coupling reaction, it is preferred to either filter the salts from the polymer solution or to wash the polymer to substantially free it from these salts.

The following examples are intended to further illustrate the present invention without limiting the same in any manner.

Glass transition temperature ($T_g$), commonly referred to as the second order phase transition temperature, refers to the inflection temperatures found by plotting the resilience (recovery from 1 percent elongation) of a film ranging in thickness from 3 to 15 mils against temperature. See Brown, Textile Research Journal, 25, 891 (1955).

Tensile properties were measured according to ASTM D-638-58T.

Pendulum impact was measured by ASTM test method D-256-56 modified as follows: A steel pendulum was used, cylindrical in shape with a diameter of 0.85 inch and weighing 1.562 pounds. The striking piece, mounted almost at the top of the pendulum was a cylinder 0.3 inch in diameter. Film specimens, 1–1.5 inches long, 0.125 inch wide and about 1 to 20 mils thick were clamped between the jaws of the tester so that the jaws were spaced 1 inch apart. The 0.125 inch width of the film was mounted vertically. The pendulum was raised to a constant height to deliver 1.13 foot pounds at the specimen. When the pendulum was released the cylindrical striking piece hit the specimen with its flat end, broke the film, and traveled to a measured height beyond. The difference in the recovery height (i.e., the difference in the potential energy of the pendulum at the maximum point of the upswing) represents the energy absorbed by the specimen during rupture. The impact strength, expressed in foot-pounds per cubic inch, is obtained by dividing the pendulum energy loss by the volume of the specimen. Five to ten specimens are tested for each material.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution expressed in terms of grams of polymer per 100 ml. of solution

Example 1

Into a flask was placed 45.64 g. (0.12 mole) of the hexahydrate of the disodium salt of 2,2-bis-(4-hydroxyphenyl)-propane and 100 ml. of toluene. The flask was fitted with a moisture trap and the mixture refluxed for 2.5 hours to remove substantially all of the water present. One hundred forty grams of benzophenone as the reaction diluent was added and the remaining toluene distilled off to a pot temperature of 210° C. The mixture was cooled, the moisture trap removed, and 37.44 g. (0.12 mole) of 4,4′-dibromodiphenyl was added. The flask was sparged with nitrogen and 9 ml. of a cuprous chloride-pyridine solution (0.09 gram cuprous chloride, 0.9 millimol) was added. The reaction mass was heated for 6 hours at 185–215° C. after which 5 mole-percent of bromobenzene was added and heating continued for an additional hour. The reaction mass was diluted with 200 ml. of toluene and the polymer product precipitated by adding ethanol containing acetic acid. The fibrous precipitate was washed with alcohol, hot water containing small amounts of acetic and hydrochloric acids, and again with hot alcohol-acetone. The product was then vacuum dried overnight at 120–5° C. The yield of polymer was 44.6 g. (45.4 calculated) and the RV was 1.11. The polymer was composed of recurring units having the formula:

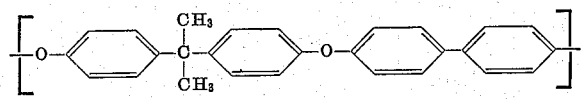

The polymer was dissolved in chlorobenzene, treated with oxalic acid and filtered through a bed of filter aid. The filtered solution was precipitated in ethanol, washed and vacuum dried. A film was molded at 300° C. and 3000 p.s.i. The film had a $T_g$ of 175° C., a tensile modulus of 240,000 p.s.i., a tensile strength of 11,000, an elongation of 150% and a pendulum impact strength of greater than 700 ft. lb./in.³ In addition the film was crystallized by orientation and was found to have a melting point of 240° C.

Example 2

Example 1 was duplicated using the 45.64 g. (0.12 mole) of the disodium salt of bis-(4-hydroxyphenyl)propane and 39.36 g. (0.12 mole) of 4,4′-dibromodiphenyl ether. The reaction was carried out at 190–210° C. for eight hours. The RV of the polymer was 0.50. The polymer was composed of recurring units having the formula:

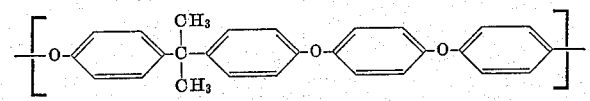

A film pressed from the polymer had a $T_g$ of 125° C., a tensile modulus of 280,000 p.s.i., a tensile strength of 8500 p.s.i., an elongation of 190% and a pendulum impact strength of greater than 350 ft. lb./in.³

Example 3

Example 1 was duplicated using 45.64 g. (0.12 mole) of the disodium salt of bis-(4-hydroxyphenyl)propane and 28.31 g. (0.12 mole) of para-dibromobenzene. The reaction was carried out at 190–210° C. for 10 hours. The RV of the polymer was 0.72. The polymer was composed of recurring units having the formula:

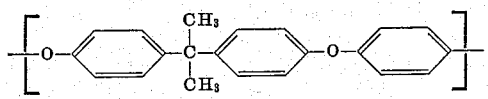

A film pressed from the polymer had a $T_g$ of 135° C., a tensile modulus of 265,000 p.s.i., a tensile strength of 8300 p.s.i., an elongation of 140%, and a pendulum impact strength of greater than 380 ft. lb.//in.³

Example 4

Example 1 was duplicated using 45.64 g. (0.12 mole) of the disodium salt of bis-(4-hydroxyphenyl)-1,1,1,3,3,3-hexafluoropropane and 37.44 g. (0.12 mole) of 4,4′-dibromodiphenyl. The reaction was carried out at 190° C. for 7 hours. The RV of the polymer was 0.44. The polymer was composed of recurring units having the formula:

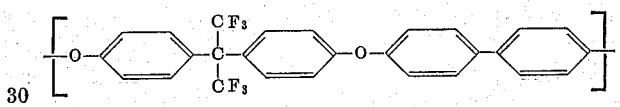

A film pressed from the polymer had a $T_g$ of 190° C., a tensile modulus of 245,000 p.s.i., a tensile strength of 7700 p.s.i., an elongation of 30%, and a pendulum impact strength of 100–300 ft. lb./in.³

Example 5

Example 1 was duplicated using 45.64 g. (0.12 mole) of the disodium salt of bis-(4-hydroxyphenyl)propane and 37.44 g. (0.12 mole) of 4,4′-dibromodiphenyl. The reaction was carried out in diphenyl ether at 185–200° C. of 6.5 hours. The RV of the polymer was 0.62 and the polymer was composed of recurring units having the formula

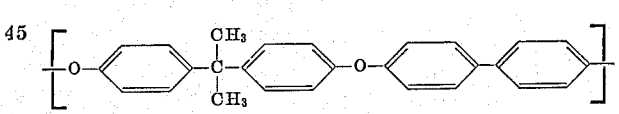

Example 6

Example 1 was duplicated using 45.64 g. (0.12 mole) of the disodium salt of bis-(4-hydroxyphenyl)propane and 28.31 g. (0.12 mole) of meta-dibromobenzene. The reaction was carried out at 190–215° C. for 19 hours. The RV of the polymer was 0.30 and it was composed of recurring units having the formula

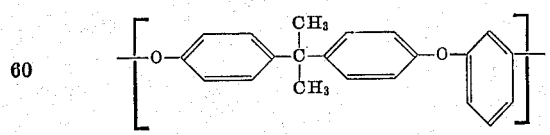

Example 7

Example 3 was duplicated except that the dipotassium salt of bis-(4-hydroxyphenyl)propane was used and the reaction was carried out in anhydrous dimethylsulfoxide at 130–135° C. for 10 hours. Cuprous chloride was used as the catalyst. The reaction was 93.4% complete.

What is claimed is:
1. A substantially linear thermoplastic polyarylene polyether composed of recurring units having the formula

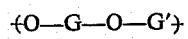

I wherein G is the residuum of a dihydric phenol selected from the group consisting of

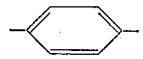 II and

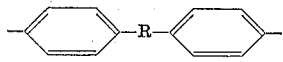 III wherein R is selected from the group consisting of a bond between aromatic carbon atoms, —O—, —S—, —S—S—, and a divalent hydrocarbon radical having from 1 to 18 carbon atoms inclusive, and G' is the residuum of a dibromo or diodobenzenoid compound selected from the group consisting of

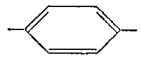 IV and

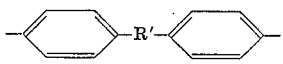 V wherein R' is as previously defined for R, with the provisos that when R is —O—, R' is other than —O—, when R' is —O—, R is other than —O—, when G is II, G' is V, and when G' is IV, G is III.

2. A substantially linear thermoplastic polyarylene polyether composed of recurring units having the formula

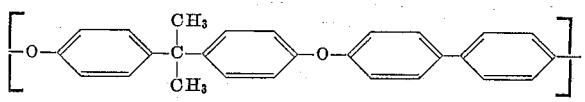

3. A substantially linear thermoplastic polyarylene polyether composed of recurring units having the formula

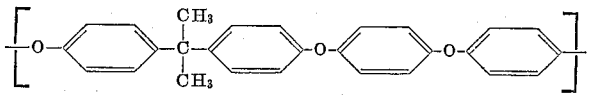

4. A substantially linear thermoplastic polyarylene polyether composed of recurring units having the formula

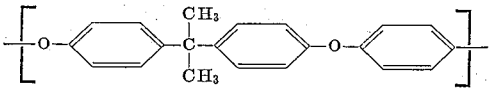

5. A substantially linear thermoplastic polyarylene polyether composed of recurring units having the formula

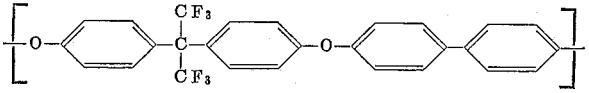

6. A substantially linear thermoplastic polyarylene polyether composed of recurring units having the formula

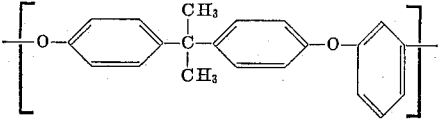

No references cited.

SAMUEL H. BLECH, *Primary Examiner.*
M. GOLDSTEIN, *Assistant Examiner.*